July 26, 1966   N. P. BECKETT   3,262,211
MARKING DEVICE
Filed Feb. 24, 1965   3 Sheets-Sheet 1

INVENTOR.
Norman P. Beckett
BY
ATTORNEY

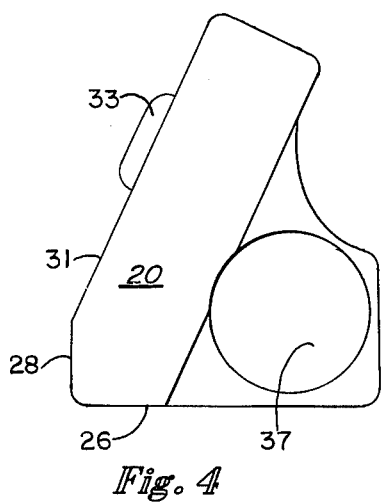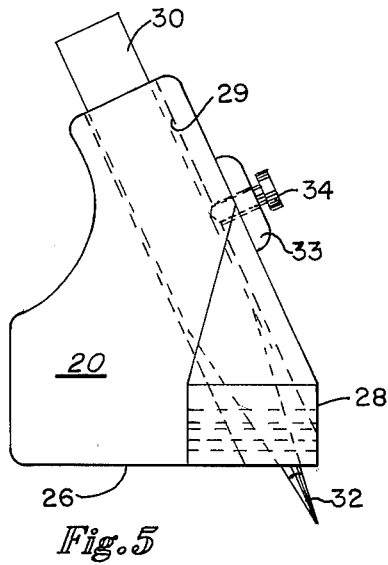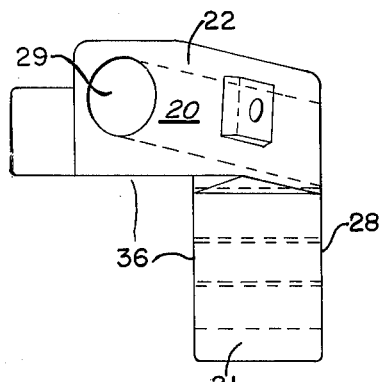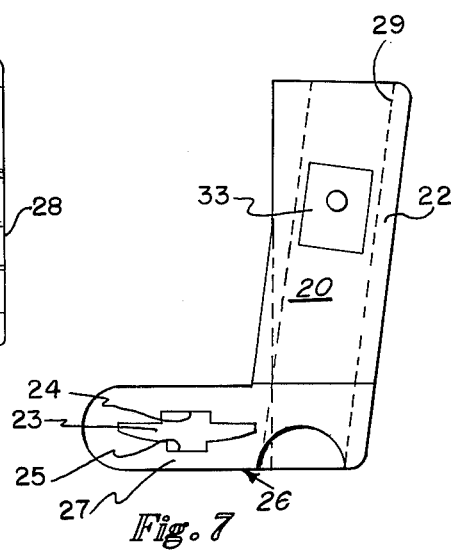

July 26, 1966 N. P. BECKETT 3,262,211
MARKING DEVICE

Filed Feb. 24, 1965

INVENTOR.
Norman P. Beckett
BY
McGrew and Edwards
ATTORNEY a corporation of Colorado
United States Patent Office 3,262,211
Patented July 26, 1966

3,262,211
MARKING DEVICE
Norman P. Beckett, Fort Collins, Colo., assignor to Measure Markers, Inc., Fort Collins, Colo., a corporation of Colorado
Filed Feb. 24, 1965, Ser. No. 434,822
8 Claims. (Cl. 33—189)

This is a continuation-in-part of application Serial No. 146,605, filed October 20, 1961, now abandoned. This invention relates to marking devices and more particularly to marking devices adapted for use in combination with and for attachment to rulers, tapes, and the like.

In the various construction trades and related occupations where measuring tools such as rulers, tapes, and the like are in frequent use, it is common practice to mark a surface or otherwise select a starting point from which a measurement is made. The measuring device is then placed on the surface, and another mark is made at a selected distance from the first mark or point. This practice has required separate marking devices, as well as extraneous items to hold an end portion of the measuring instrument in place while the other end is extended for the desired distance on the surface to be measured and marked. Such procedures are time consuming and require a considerable degree of manual dexterity on the part of a worker to accomplish all such movements while maintaining the measuring tool accurately in place.

Accordingly it is an object of this invention to provide a simple, durable and accurate marking device which is particularly adapted for mounting on rulers, tapes, and the like.

Another object of the invention is to provide a simple, durable and accurate marking device which is constructed and arranged for mounting on a measuring tool, slidably movable with respect thereto and then functions as an integral portion thereof.

Still another object of the invention is to provide an attachable marking device for commercially available measuring instruments which will make a mark aligned with, displaced from a side of, and not extending beyond the end of such an instrument, without obstruction to other uses of said instrument.

A further object of the invention is to provide a marking device adapted for direct attachment to a measuring tool having selectively operable marking means adapted for retracting movement to inoperative position on the tool when not in use.

Still another object of the invention is to provide a simple, accurate and easily operated marking device adapted for attachment to commercially available measuring instruments without requiring modification thereof, or may be made an integral part thereof, which does not conflict with the normal use of the measuring instrument and which device is easily used with a minimum of instruction.

In the parent application above referred to there was disclosed according to the invention a marking device wherein a body or housing slidably mounted on a measuring tool positioned a scribing member with respect to the measuring tool and a work surface so that sighted graduations on the measuring tool extending from the body and measured lengths along the measuring tool could be marked with ease and accuracy. The marking device disclosed therein included means for locking to the body or housing the measuring tool which functions as an integral part thereof without conflicting with the normal use, opening or closing of the measuring tool. Various means were described for allowing selective extension and retraction of the scribing member between the operative and inoperative positions.

A marking device according to my invention incorporates that disclosed in my parent application with additional improvements. This marking device includes a main body having an internal passage or recess extending between upper and lower surfaces. The cross-sectional dimension of the recess is substantially the same as and slightly larger than the ruler. Ruler, as hereinafter used, is intended to include various types of measuring tools or instruments having spaced graduations such as straight edged scales, rules and various steel tapes including those of the type which coil into a housing. The bottom portion of the body between the recess and the lower surface functions to position the scribing element with respect to the ruler and a supporting work surface to be marked.

An external surface of the body at the forward end of the recess is disposed in a plane perpendicular to the end of the ruler and as the ruler is extended for the purpose of measurement provides a sight for graduations on the ruler emerging from the recess. A portion of the body includes a bore displaced from a side of the ruler and disposed in a preferred form in a substantially upright position with respect to the graduated surface of the ruler but preferably is inclined rearwardly at an angle and inclined inwardly at an angle toward a side of the ruler to more advantageously position the marking terminus of the scribing member. A scribing member in the bore extends through the base so that its marking terminus is below the bore to contact the work surface when it is in the plane including the external sighting surface of the body whereby the position of a sighted graduation and specific measurement parallel to the ruler may be accurately marked on the work surface.

Improved means for locking the scribing device in the operative position and in a retracted inoperative position are disclosed. The inclination of the bore toward the ruler shown in an added embodiment positions the markings terminus in closer proximity to the graduation of the ruler so as to assist in aligning the marking terminus with the forward sighting surface of the body. Additional embodiments of marking devices are disclosed which may be either detached from a standard tape housing or may be an integral part of all or a part of a standard tape housing. In the integral embodiments the forward face of the housing having a recess through which the tape extends preferably becomes the sighting surface for the measurement, the scribing member is inclined rearwardly and inwardly, the marking terminus extends below the housing base, and the housing base is positioned in the work surface during marking.

The practice of my invention will be described with reference to the accompanying drawings. In the drawings in the several views of which like reference numerals are used to designate like parts:

FIG. 4 is a right side elevation of another embodiment of my invention;

FIG. 5 is a left side elevation of the marking device shown in FIG. 4 with a scribing member shown in position;

FIG. 6 is a top plan view of the marking device shown in FIG. 4;

FIG. 7 is a front elevation of the marking device shown in FIG. 4;

Figure 1:
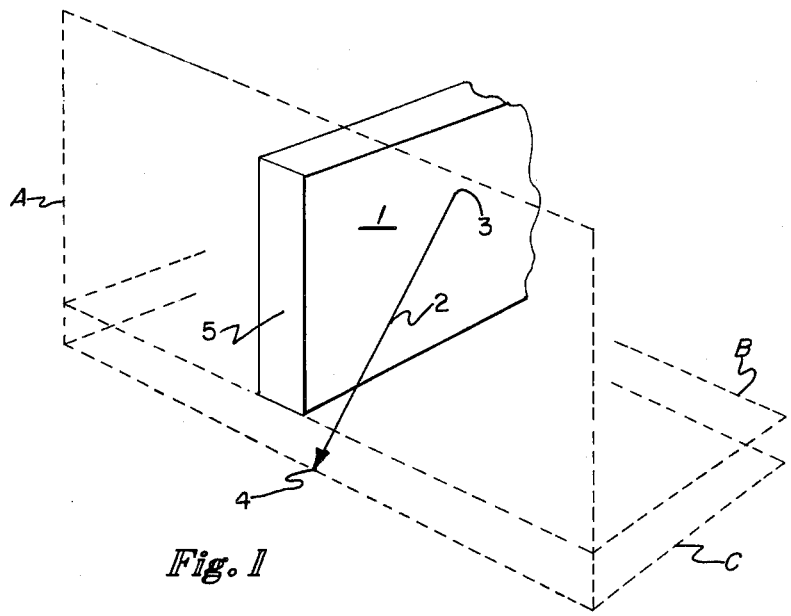
FIG. 1 is a schematic isometric view of the relative planes of the elements utilized in an embodiment of a marking device according to my invention.

A schematic representation of the bore disposed in a substantially parallel position with respect to the graduated surface of the ruler is shown in FIG. 1.

Referring now to FIG. 1, the ruler 1 is schematically represented as a fragmentary end portion of a rectangle, while scribing element 2 of the marking device is indicated by an arrow with end 3 representing the thumbscrew and the arrowhead representing the scribing terminus 4 of the scribing element. The forward or terminal face 5 of ruler 1 is in plane A. When the scribing element 2 is in its retracted position the scribing terminus 4 thereof is above plane B perpendicular to plane A and away from plane A. In the extended position as schematically shown in FIG. 1, the scribing terminus 4 coincides with the intersection of planes A and C. Since plane A is common with the terminal face 5 of ruler 1, a mark made by scribing terminus 4 is in plane A, identical with the terminal face 5 of ruler 1, and a simple movement of ruler 1 scribes a mark on a surface being worked which mark also is identical with the terminal face 5 of ruler 1. While reference is made to the terminal face or end of a ruler for convenience in description, it should be understood that face 5 will be the working end or terminal measurement on a ruler on which the marking device is mounted.

In use, the operator positions the measuring tool or ruler with a desired linear unit thereof adjacent a starting point. For example, considering a two foot increment to be measured, the 24 inch mark is accurately positioned at a starting point. When this has been accomplished and the measuring device is affixed to the ruler, it becomes an integral portion thereof and a very slight movement of the working end scribes a mark accurately at said working end to accurately define the desired 24 inch increment. After the measurement has been accomplished and the desired mark scribed on the surface being worked, knurled knob 3 is pulled to retract the marking terminus 4, thereby placing the device in inoperative position and withdrawing the scribing terminus 4 from possible undesirable contact with adjacent materials or tools until more scribing is required and also preventing personal injury.

In geometrical terms, the scribing element 2 is held inclined in a plane parallel to the longitudinal axis of the measuring device or ruler 1. And as shown in FIG. 1 that plane is parallel to the upper surface or flat of the measuring device. Various means are suitable for selective extension and retraction of the scribing element between the operative and inoperative positions. Those described in my parent application above referred to are a spring-biased ball member disposed at right angles to a pair of spaced grooves in the scribing element and also a spring-bias at the forward portion of the scribing element holding its marking terminus away from the work until forced against the work surface. Various scribing elements, including pencils, metal scribes, crayons, soapstones, and pens are suitable. The hollow pen housing an ink reservoir with a sponge-like marking terminus is an example.

Figures 2, 3:
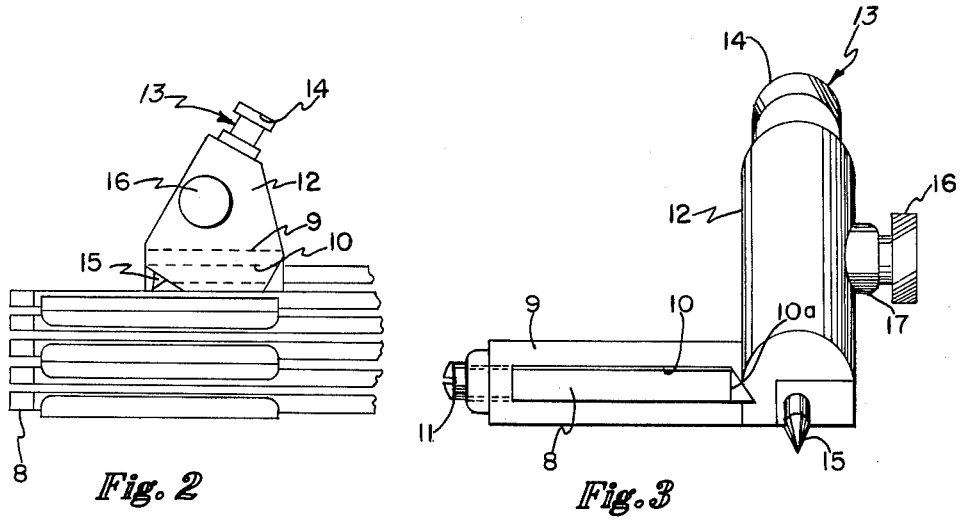
FIG. 2 is an embodiment of a marking device mounted for use with a folding type ruler.
FIG. 3 is a front elevation of the marking device shown in FIG. 2.
Figure 9:
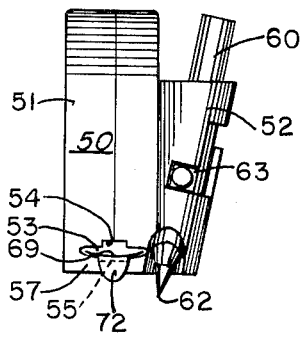
FIG. 9 is a front elevation view of another embodiment of my invention wherein the tape housing is an integral part of the marking device.
Figure 10:
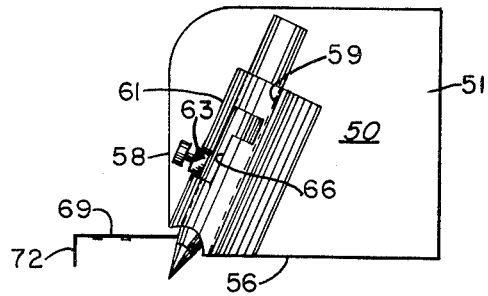
FIG. 10 is a side elevation view of the marking device shown in FIG. 9.
Figure 11:
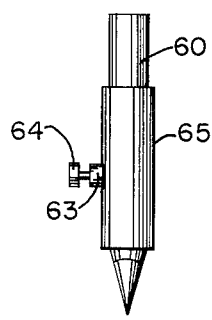
FIG. 11 is an enlarged elevation view of the scribing device mounted in the housing member as is used in the marking device shown in FIG. 9.

FIGS. 2 and 3 illustrate another modified form of marking device in which the scribing element is positioned diagonally in a plane which is perpendicular to the flat of the ruler and which is offset from the edge of the ruler, and perpendicular to the plane in which the working end or terminal face of a ruler lies, allowing the flat of the ruler to be used in a horizontal position. Further, in order to show the adaptability of marking devices according to my invention, in FIG. 2 I have shown it mounted on a folding ruler 8 of the type normally used by plumbers, electricians, machinists or the like. The main housing which encompasses the working parts of the marking device includes two main portions. A horizontal portion 9 having a recess 10 formed therethrough which is similar in cross section, but slightly larger than the cross section of a ruler 8, is adapted to contain such a ruler. By suitable manipulation of screw 11 this device may be locked on the end of ruler 8. It also allows selective movement along a ruler if desired since it is not permanently fixed.

An upstanding or vertical portion 12 contains a scribing element 13 disposed at an inclination and having a knurled head 14 at its upper end for manual advance or retraction of a scribing terminus 15 at its opposite end. The scribing element 13 is selectively secured in vertical portion 12 by a set screw 16 operable through a boss 17 mounted on a side of vertical portion 12 perpendicular to its lengthwise axis.

In FIG. 2 the scribing terminus 15 is shown in its retracted position in which the ruler 8 is collapsed and the marking device is inoperative. Note that in its retracted position, scribing terminus 15 is above any adjacent surface portion of ruler 8, allowing the ruler to be moved to a folded position without inconvenience since the scribing terminus 15 is concealed from accidental damage and possible damage to the attire of a user as when carried in a pocket, bib or apron, etc., is prevented. Attention is also directed to the biased edge 10a of the recess or passage 10 formed through housing. This serves the purpose of permitting rulers of a rectangular configuration having a biased leading edge to be used in the same marking device.

In FIGS. 4 through 8 there is shown an embodiment of my marking device suitable for use with and slidably attached to a conventional steel tape enclosed in a housing. This marking device includes an integral body generally indicated by numeral 20. Body 20 includes a recessed portion 21 and an adjoining upstanding portion 22. Recessed portion has a recess 23 extending therethrough between parallel upper and lower surfaces. The cross-sectional dimension of recess 23 is shaped the same as and slightly larger than the section of the tape with which it is used and includes upper and lower grooves 24 and 25 to receive protruding rivets which attach the end stop or end clip to the end of the tape and a portion of the end stop or clip. Recess 23 thereby provides for aligned movement of the body along the tape or the tape through the body.

The bottom surface 26 of the body is flat and is held in substantially the same plane as the tape housing when the tape extends therethrough. Between the bottom surface 26 and recess 23 there is a bottom portion 27 which functions to position the scribing element with respect to the extended tape and the work surface.

The forward surface 28 of the body extending along both the recessed and upstanding portions 21 and 22 is disposed in a plane perpendicular to the end of the tape emerging from the recess 23 and perpendicular to the bottom surface 26 of the body. Surface 28 thereby provides a sight for a selected graduation on the tape and thus alignment with the terminus of the scribing element as is described more fully hereinafter.

Upstanding portion 22 includes a bore 29 inclined in two directions shaped to receive a scribing element 30 (FIG. 5). Bore 29 is inclined rearwardly in a plane substantially parallel to the side edge surface of the tape as is the forward surface 31 above vertical surface 28 of portion 22. This angle of rearward inclination is preferably about 25°. Bore 29 is displaced from a side of recess 23 by a dividing partition of the body and is inclined inwardly toward the recess 23 in a plane transverse to a side edge surface of the tape. This inward inclination positions the marking terminus 32 in closer proximity to the graduated surface of the tape and the sighting surface 28 of the body thereby providing easier and more accurate positioning of terminus 32. The angle of inward inclination will vary from about 7° to 15° depending on the size of tape being used. Bore 29 extends through bottom surface 26 and a scribing element 30 disposed in bore inclined as above described will extend to a marking position so that its marking terminus 32 is in the plane including the external sighting surface 28. In this position terminus 32 extends below bottom surface 26 to mark the work surface. I prefer the extension through surface 26 to be about 3/16 inch. Scribing element 30 disposed in bore 29 can thereby be positioned with respect to the tape and the work surface so that its terminus 32 will mark the work surface when positioned in the plane which includes forward face 28 of the body which will be hereinafter referred to as the operative position.

Inclined forward surface 31 has a threaded boss 33, having a threaded aperture extending to bore 29 with a threaded screw 34 therein. Threaded screw 34 abuts the side of scribing element 30 to hold it in a selective operative or inoperative position. The scribing element 30 is illustrated in FIG. 5 as in the operative position and may be retracted to the inoperative position by loosening the screw 34 and raising scribing element 30 up so that its terminus 32 is within the bore 29 and screw 34 is then tightened.

At the rear surface of the body 20 the recessed portion 21 adjoins the inward side of upstanding portion 22 to provide a right-angle notched portion 36 which will abut the forward and side surfaces of a tape housing. The bottom portion 27 of the body is proportioned so that the recess 23 when aligned with the opening of the tape housing through which the tape extends and the bottom surface of the housing will be in substantially the same plane as body bottom surface 26.

On the outer surface of upstanding portion 22 there is provided a circular concave portion 37 which receives the end of the thumb when the body 20 and tape housing are grasped in one hand.

Figure 8:
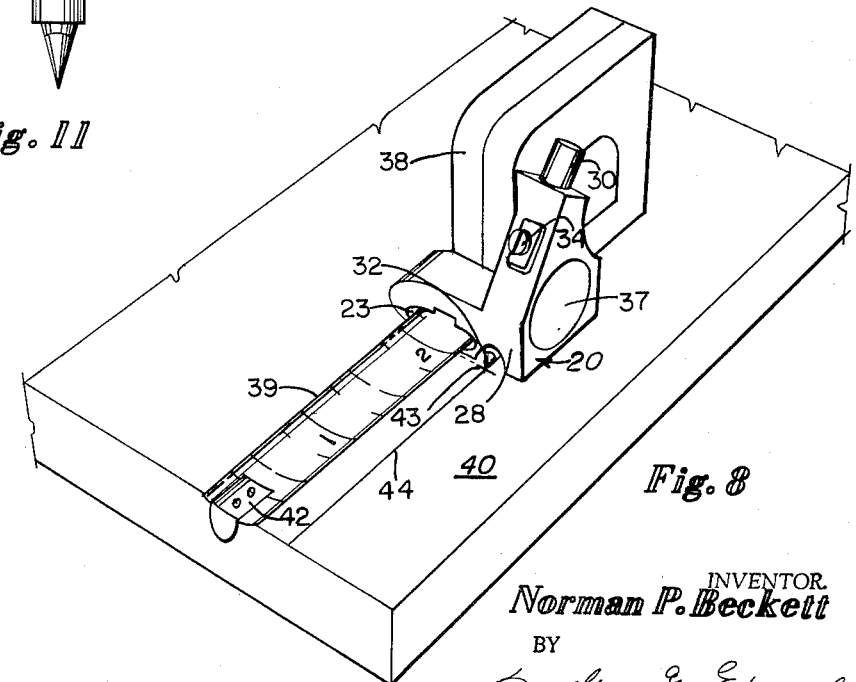
FIG. 8 is a perspective view of the marking device shown in FIG. 4 mounted for use in combination with a tape.

The marking device of FIGS. 4 through 7 is illustrated in FIG. 8 in combination with a conventional steel tape. In FIG. 8 a conventional housing 38 for the tape having a portion of the tape 39 extending therefrom is shown positioned on a horizontally disposed work surface 40. The marking device is slidably positioned on the tape 39 which extends through recess 23. The forward surface of housing 38 is shown abutting the notched portion 36 (not visible) and the bent portion of end stop 42 will normally be pulled against the forward surface 28 by the spring enclosed in housing 38 which pulls the tape 39 back into the housing when not in use. Thus body 20 will be attached to the tape and housing at all times. Body 20 is attached to the tape as shown by pulling all of the tape from the housing and detaching the tape from a portion of the flat spring which protrudes through the recess of the housing. The end of the tape disconnected from the spring is slipped through recess 23 and then again attached to the protruding end of the spring. The spring in the housing will then recoil the tape.

With the body 20 abutting housing 38 measurements on marking surface 40 may be made in the following way. Scribing element 30 is first positioned on body 20 in the operative position referred to above and screw 34 is tightened. The body surfaces 36 are held snugly against housing 38 as shown in FIG. 8 with operator clasping both housing and body in one hand and having the thumb positioned on concave portion 37. Tape 39 is extended using the other hand with the clip secured at a starting point, then the desired length and the selected graduation on the tape is sighted along the forward surface 28 of the body. When body 20 is held against housing 38 the relationship of the inner surfaces 36 and recess 23 may be such that an inner surface of recess 23 may be forced against a side of tape 39 and will thereby hold the tape in the extended position. The marking terminus and a portion of the housing will rest on the work surface 40. A slight sideways movement will mark the length measurement as shown at 43. A measured line 44 may be made along the tape by moving body 20 and housing 38 a selected distance along tape 39. Both markings 43 and 44 being made on the supporting work surface 40 while the extended portion of the tape 39 is fully visible so that the marking device in no way conflicts with the normal use of the tape.

Various modifications in operation for marking various types of work surfaces are possible. For example, the marking device of FIGS. 4 through 7 may conveniently be used at the opposite or extended end of the tape or intermediate the ends of an extended tape.

Most standard tapes have the end stop or clip 42 which is slidable to compensate for inside and outside measurements. When face 28 is moved against end stop 42 it will adjust so that the scribing element will mark accurately a point corresponding to the end of the tape. Measurements intermediate the ends of the extended tape may be made by hooking the end stop 42 over an edge of the work piece, pulling the housing with one hand, and marking selected intermediate lengths with the other hand. This latter measuring operation is particularly suitable for measuring distances on walls and ceilings requiring only a single operation.

Another example illustrating the versatility of my marking device is for inside measurements. An inside measurement may be laid off by extending body 20 so that its forward surface 28 abuts end stop 42. In this case the selected graduation is sighted along the forward surface of housing 38 and the additional length of the tape housing 38 is added to the total measurement.

The advantages of the marking device illustrated in FIGS. 4 through 7 are many. It is easily attached to a standard tape and becomes a part thereof. It is movable along the tape and may be used for marking at either end or intermediate the ends of the tape. The scribing element is easily and accurately set for marking and once positioned will make multiple markings at any position on the tape. A single operator may lay off distances heretofore normally requiring two. The device in no way conflicts with the normal use of the tape.

Referring now to FIGS. 9 through 12 there is shown an alternative embodiment wherein the marking device is made integral with the housing for the tape. This embodiment includes an integral body generally indicated by numeral 50. Body 50 includes a recessed portion 51 and an adjoining upstanding portion 52. Recessed portion 51 has a recess 53 extending therethrough between parallel upper and lower surfaces. The cross-sectioned dimension of recess 53 is shaped the same as and slightly larger than the section of the tape and includes upper and lower grooves 54 and 55 to receive protruding rivets and a portion of the end stop as described with reference to FIGS. 4 through 7.

The bottom surface 56 of the body is flat and is positioned with respect to the work surface during the marking operation as described with reference to FIG. 8. Between the bottom surface 56 and recess 53 there is a bottom portion 57 which functions to position the scribing element with respect to the extended tape and the work surface to be marked. A major part of recessed portion 51 is for enclosing the tape and includes a spring-controlled drum (not shown) on which the tape is wound. The interior structure of this housing is conventional and therefore has not been illustrated in detail.

The forward surface 58 of the body is disposed in a plane perpendicular to the end of the tape 69 emerging from the recess 53 at surface 58 and perpendicular to the bottom surface 56 of the body. Surface 58 thereby provides a sight for a selected graduation of the tape and then alignment with the scribing element terminus 63 in the manner referred to above.

Upstanding portion 52 includes an inclined bore 59 shaped to receive a scribing element 60 encased in a cylinder 65. Bore 59 is inclined rearwardly as is the forward surface 61. Bore 59 is displaced from a side of recess 53 by a dividing partition of the body and is inclined inwardly toward recess 53 so as to position the marking terminus 62 closer to a side of the tape 69 thereby providing easier and more accurate positioning of terminus 62 in the plane including forward surface 58. The marking terminus 62 when extended to the operative position, as shown, extends below bottom surface 56 to contact the surface to be marked. The preferred distance is about 3/16 inch. The angles of rearward and inward inclination will preferably be the same as that described with respect to FIGS. 4 through 7.

The hollow tubular member 65 (FIG. 11) having a threaded boss 63 is disposed in bore 59 and has an interior diameter shaped to slidably receive the scribing element 60. A threaded aperture extends through boss 63 extending to its inner surface and receives a threaded screw 64. Threaded screw 64 abuts a side of scribing element 60 to hold it rigidly in member 65.

Figure 12:
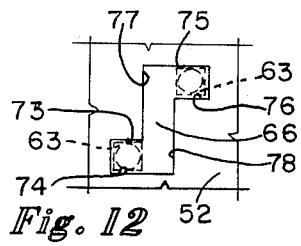
FIG. 12 is an enlarged developed section of the slotted portion of the marking device shown in FIG. 9.

Upright portion 52 includes a slotted portion 66 extending from the bore to its exterior surface for positioning the scribing element 60 contained in member 65 in the operative and inoperative positions. Referring to FIG. 12 there is shown slotted portion 66 which includes lower opposing faces 73 and 74 for holding boss 63 in the operative position. Upper opposing faces 75 and 76 hold boss 63 in the inoperative position. Between the upper and lower faces there are opposing faces 77 and 78 at substantially right angles to the upper and lower faces for guiding the boss 63 between the inoperative position.

Scribing element 60 when disposed in member 65 will be initially adjusted by disposing boss 63 in the lower position between faces 73 and 74 with its marking terminus 62 extended to the plane of forward surface 58. Screw 64 will then be tightened and the selected markings on a supporting work surface may then be marked with terminus 62 and a portion of base 56 contacting the work surface in a manner similar to those described with reference to FIG. 8. Movement of the scribing element to the inoperative position is accomplished by twisting the upper end of scribing element counterclockwise and pulling it upwardly and then twisting it further counterclockwise into faces 75 and 76 where it is held until additional markings are desired. By reversing the movement by a clockwise and downward movement the scribing element can be returned to the operative marking position.

The embodiment as shown in FIGS. 9 through 12 may be cast as an integral unit using material such as plastic or metal with recessed portion 51 being substantially the same size and shape as a conventional tape housing. Or recessed portion 51 may be a conventional tape housing with upstanding portion 52 fixedly attached thereto as by screws or the like. With this arrangement the forward face of the housing where the graduated surface of the tape emerges becomes the sight of any specific measurement and the bore is so disposed with respect thereto that the marking terminus will be extended to the plane which includes the forward face of the housing. The tape housing then performs part of the function of positioning the tape with respect to the scribing member and work surface. A portion of the bottom surface will rest on the work surface to be marked when the marking terminus is extended for the marking operator. In the alternative only a portion of a conventional tape housing could be used in combination with an attachable cast marker structure outlined in FIGS. 9 through 12 to position the scribing element with respect to the work surface and the extended tape.

From the foregoing it is apparent that various modifications may be made from the slidably attached embodiment shown in FIGS. 4 through 7 and the integral embodiment shown in FIGS. 9 through 12. Although I have illustrated specific embodiments of my invention, various modifications will occur to those skilled in the art. Therefore, I do not desire my invention be limited to the specific details illustrated and described and I intend by the appended claims to cover all modifications which fall within the spirit and scope of my invention.

I claim:

1. In a marking device for use with a graduated scale, an integral body having a housing portion for enclosing the scale and inclusive of a recess through which an extended portion of the scale extends, said recess being slightly larger than the section of the scale for sliding movement of the scale therein, said body including a bottom portion between the scale and a work surface to be marked, said body having an external surface at the forward end of the recess in a plane perpendicular to the longitudinal axis of the extended scale for providing a sight for graduations on the scale emerging from the recess, another portion of the body containing a bore inclined in two directions, one inclination being in a plane substantially parallel to a side edge surface of the scale and the other inclination being in a plane transverse to said edge surface of the scale for supporting a scribing device in the bore so that its marking surface will extend to the work surface and to the plane of said external surface whereby the position of a sighted graduation and a measured line parallel to the scale may be marked on the work surface while the extended portion of the scale is fully visible, and locking means for maintaining the scribing device in the marking position in said bore.

2. A marking device as set forth in claim 1 wherein said graduated scale is a flexible tape.

3. In a marking device for use with a graduated scale, an integral body having a portion inclusive of a recess through which an extended portion of the scale extends, said recess being slightly larger than the section of the scale for sliding movement of the scale therein, said body including a bottom portion between the scale and a work surface to be marked, said body having an external surface at the forward end of the recess in a plane perpendicular to the longitudinal axis of the extended scale for providing a sight for graduations on the scale emerging from the recess, another portion of the body containing a bore inclined in two directions, one inclination being in a plane substantially parallel to a side edge surface of the scale and the other inclination being in a plane transverse to said edge surface of the scale for supporting a scribing device in the bore so that its marking surface will extend to the work surface and to the plane of said external surface whereby the position of a sighted graduation and a measured line parallel to the scale may be marked on the work surface while the extended portion of the scale is fully visible, and locking means for maintaining the scribing device in the marking position in said bore.

4. A marking device as set forth in claim 3 wherein the sides of said recess are in close fitted relation to the side edge surfaces of the scale for maintaining linear movement of the body along the scale parallel to the edge surfaces of the scale.

5. A marking device as set forth in claim 3 wherein said locking means maintains the scribing device in marking and retracted positions in said bore.

6. A marking device as set forth in claim 3 wherein said locking means includes a member threaded through a portion of the body into said bore and contacting said scribing device.

7. A marking device as set forth in claim 3 wherein said locking means includes a tubular member enclosing a portion of the scribing device in the bore and having an exterior surface which alternately engages spaced slotted portions in the body to maintain the scribing device in marking and retracted positions in said bore.

8. In a marking device for use with a graduated scale, an integral body having a portion inclusive of a recess through which an extended portion of the scale extends, said recess being slightly larger than the section of the scale for sliding movement of the scale therein, means adjacent said recess portion of the body for engaging a surface of the scale for locking the body at selected positions lengthwise of the scale, said body including a bottom portion in surface contacting relationship between the scale and a work surface to be marked, said body having an external surface of the forward end of the recess in a plane perpendicular to the longitudinal axis of the extended scale for providing a sight for graduations on the scale emerging from the recess, another portion of the body containing a bore inclined in a plane substantially parallel to a side edge of the scale for supporting the scribing device in the bore so that its marking surface will extend to the work surface and to the plane of said external surface whereby the position of the sighted graduation and measured line parallel to the scale may be marked on the work surface while the extended portion of the scale is fully visible, and locking means for maintaining the scribing device in the marking position in said bore.

References Cited by the Examiner
UNITED STATES PATENTS

| | | | |
|---|---|---|---|
| 345,196 | 7/1886 | Vose | 33—43 |
| 1,028,228 | 6/1912 | Lampel | 33—152 X |
| 2,466,357 | 4/1949 | Beith | 33—42 |
| 2,649,787 | 8/1953 | Kobayashi | 33—189 |
| 2,807,886 | 10/1957 | Aciego | 33—189 |
| 2,893,122 | 7/1959 | Greco | 33—27 |

FOREIGN PATENTS

| | | |
|---|---|---|
| 491,820 | 4/1953 | Canada. |
| 123,993 | 2/1949 | Sweden. |

LEONARD FORMAN, *Primary Examiner.*

ISAAC LISANN, *Examiner.*

W. D. MARTIN, *Assistant Examiner.*